United States Patent Office 2,820,695
Patented Jan. 21, 1958

2,820,695

STABILIZATION OF LIQUID SULFUR TRIOXIDE AND OLEUMS

Rudolph Pick, Elizabeth, N. J., assignor to E. I. du Pont de Nemours and Company, Wilmington, Del., a corporation of Delaware No Drawing. Application January 3, 1956
Serial No. 556,816

8 Claims. (Cl. 23—167)

This invention relates to liquid sulfur trioxide and high strength oleums that are stabilized against polymerization; and to the stabilization thereof employing titanium and/or silicon dioxides as polymerization inhibitors.

As is well known, sulfur trioxide exists in three forms having melting points of 17° C., 32.5° C., and 62° C. The polymeric form melting at 62° C., alpha $SO_3$, is the stable form under ordinary conditions. Upon freezing or even after standing at room temperature a short time the liquid gamma form (M. P. 17° C.) ordinarily changes to the solid forms.

This transition of liquid sulfur trioxide to solid polymeric forms is extremely undesirable from the standpoint of ease in handling and usage. In most instances, prior to usage the solidified sulfur trioxide must be remelted by heating to temperatures up to about 100° C., thereby developing dangerous high pressures in some instances.

High strength oleums of free sulfur trioxide strengths upward of about 80% tend to polymerize in a similar fashion. The degree of polymerization depends chiefly upon the sulfur trioxide strength of the oleum and the temperautres at which the material is stored. While polymerization will not proceed sufficiently far in some of these oleums to give a completely solid product, the degree of polymerization increases on the passage of time so that the ultimate mass will ordinarily contain solid forms of $SO_3$ in suspension in the oleum. This polymerization of sulfur trioxide in high strength oleums is also highly undesirable.

I have discovered that liquid sulfur trioxide and oleum of $SO_3$ strength such that $SO_3$ polymers tend to form can be stabilized against $SO_3$ polymerization by incorporating therein a minor amount of titanium and/or silicon dioxides, and then heating the product for several hours in the range of about 50° C.–100° C. The preferred heat treatment is for at least 6 hours at about 80° C.

Titanium dioxide and silicon dioxide can be used as such; also they can be used in an activated form which has dehydrating characteristics, such as silica gel. Alternatively, the source of titanium or silicon dioxide can be a complex metal oxide containing $SiO_2$ or $TiO_2$ as part of the complex. For example, one or more silicates, such as a calcium aluminum silicate or sodium aluminum silicate, and oxidic titanates, such as alkali metal titanates, can be used.

The amount of these inhibiting agents to be incorporated in the $SO_3$ or oleum will vary with the use for which the $SO_3$-containing product is intended and with the conditions it will be expected to meet. The stabilizing influence of these inhibiting agents is proportional to the amount present. In general, it usually is desirable to use only sufficient amount to stabilize the product against substantial polymerization of $SO_3$, although relatively larger amounts of these inhibiting agents can be used where the presence of an excess is not objectionable. In most cases it is desirable to use no more than about 10% combined weight of titania and/or silica with from 0.2 to 5% based on the free $SO_3$ content being the preferred range. The higher percentages ordinarily are employed to stabilize the oleums.

The preferred compositions of this invention consist of liquid sulfur trioxide or oleum containing not more than about 0.1% of water, which materials are stabilized with from 0.2 to 5% by weight of titania and/or silica. Oleum containing not more than about 0.1% of water is, of course, oleum of $SO_3$ strength not less than about 99.49 and sulfuric acid content of not more than 0.56%. These materials high in sulfur trioxide can be stabilized readily so as to resist polymerization even after storage for long periods of time.

The stabilizing agent can be added directly to the liquid sulfur trioxide or oleum to be stabilized followed by thorough agitation of the liquid. Alternatively, in the case of stabilizing pure liquid sulfur trioxide, $SO_3$ vapor can be condensed in a closed vessel containing the desired amount of stabilizing agent.

Materials stabilized in accordance with my method do not polymerize to any appreciable extent. They remain substantially in the liquid gamma form at room temperature. Furthermore, the stabilization inhibitor function as an antifreeze, lowering the freezing point substantially in most instances. After freezing by being cooled to a low temperature, these stabilized materials melt rapidly upon being reheated to a temperature of about 40° C. or less. Therefore, these products can be used directly in commercial application without first putting them through a tedious remelting process.

In order that the invention can be better understood the following examples in addition to those set forth above are given:

Example 1

Two percent by weight of silicon dioxide in the form of silica gel is added to anhydrous liquid gamma sulfur trioxide. The mixture is then heated for 16 hours at a temperature of 80° C. Upon standing at room temperature for several days, the thusly stabilized sulfur trioxide shows no tendency toward polymerization and solidification.

This mixture is found to have a freezing point of 5° C demonstrating the antifreeze action of this polymerization inhibitor. Upon warming to 35° C., the sulfur trioxide mixture melts.

Example 2

One percent by weight of a sodium aluminum silicate marketed under the proprietary name "Molecular Sieve" by the Linde Air Company is added to liquid anhydrous gamma sulfur trioxide with agitation. This mixture then heated for 16 hours at a temperature of 70° C. After standing at room temperature for several days, the thusly stabilized sulfur trioxide exhibits no tendency toward solidification. This mixture has a freezing point of 5° C. and remelts on warming to 35° C.

Example 3

Five percent by weight of finely divided anorthite, calcium aluminum silicate mineral, is added to oleum of 99.5% of $SO_3$ strength with agitation. The mixture is then heated to 100° C. for 10 hours. Upon standing at room temperature for several days, the thusly stabilized oleum shows no tendency toward polymerization and solidification.

Example 4

One percent by weight of titania of the rutile type added with agitation to anhydrous liquid sulfur trioxide. The mixture is then heated for 24 hours at a temperature of 80° C. After standing at room temperature for several days, the thusly stabilized sulfur trioxide shows no tendency toward polymerization and solidification. This mixture has a freezing point of 5° C. and remelts on warming to 35° C.

Oleum and liquid sulfur trioxide are also stabilized in accordance with the procedures of the above examples, but substituting for the polymerization inhibitors of these examples the following mixed mineral silicates: oligoclase, labradorite, anthophyllite, forsterite, lepidolite, garnet, melonite, sillimanite and kyanite.

I claim:

1. The method of stabilizing against $SO_3$ polymerization a compound selected from the group consisting of liquid sulfur trioxide and oleum of $SO_3$ strength such that $SO_3$ polymers tend to form comprising incorporating therein about 0.2 to 5% by weight based on $SO_3$ content of a material selected from the group consisting of silica and titania and then heating for several hours at a temperature in the range of 50° C. to 100° C.

2. The method of stabilizing liquid sulfur trioxide containing not more than 0.1% of water against $SO_3$ polymerization comprising incorporating therein about 0.2 to 5% by weight based on $SO_3$ content of a material selected from the group consisting of silica and titania.

3. The method of stabilizing liquid sulfur trioxide against $SO_3$ polymerization comprising incorporating therein about 0.2 to 5% by weight based on $SO_3$ content of a material selected from the group consisting of silica and titania.

4. A composition containing a material selected from the group consisting of sulphur trioxide and oleum of $SO_3$ strength such that $SO_3$ polymers tend to form, and a material selected from the group consisting of silica and titania in an amount up to 10% by weight based on $SO_3$ content.

5. A composition comprising a material selected from the group consisting of sulfur trioxide and oleum of $SO_3$ strength such that $SO_3$ polymers tend to form and about 0.2 to 10% by weight based on $SO_3$ content of a material selected from the group consisting of silica and titania.

6. A composition comprising liquid sulfur trioxide containing not more than about 0.1% of water and between about 0.2 and 5% by weight based on $SO_3$ content of a material selected from the group consisting of silica and titania.

7. The method of stabilizing against $SO_3$ polymerization the material selected from the group consisting of liquid sulfur trioxide and oleum of $SO_3$ strength such that $SO_3$ polymers tend to form comprising incorporating therein a compound selected from the group consisting of silica and titania in an amount up to 10% by weight based on $SO_3$ content.

8. The method of stabilizing against $SO_3$ polymerization the material selected from the group consisting of liquid sulfur trioxide and oleum of $SO_3$ strength such that polymers tend to form comprising incorporating therein a compound selected from the group consisting of silica and titania in an amount up to 10% by weight based on $SO_3$ content and then heating the resulting composition for several hours at a temperature in the range of 50° C. to 100° C.

References Cited in the file of this patent

UNITED STATES PATENTS

| | | |
|---|---|---|
| 2,716,593 | Litant et al. | Aug. 30, 1955 |
| 2,716,594 | Harris et al. | Aug. 30, 1955 |

FOREIGN PATENTS

| | | |
|---|---|---|
| 669,214 | Great Britain | Mar. 26, 1952 |